United States Patent [19]
Obata

[11] Patent Number: 5,161,873
[45] Date of Patent: Nov. 10, 1992

[54] APPARATUS FOR LIGHTING OF LIQUID CRYSTAL

[75] Inventor: Masao Obata, Nara, Japan

[73] Assignee: Sharp Kabushiki Kaisha, Osaka, Japan

[21] Appl. No.: 841,367

[22] Filed: Feb. 25, 1992

[30] Foreign Application Priority Data

Feb. 27, 1991 [JP] Japan .................................. 3-32946

[51] Int. Cl.$^5$ .............................................. F21V 7/04
[52] U.S. Cl. ...................... 362/31; 362/245; 362/318; 362/224
[58] Field of Search ............ 362/26, 27, 31, 223, 362/244, 245, 246, 318, 330, 331, 332, 224; 359/42

[56] References Cited

U.S. PATENT DOCUMENTS 4,860,171 8/1989 Kojima ............................. 362/331 X
5,046,826 10/1991 Iwamoto et al. ................. 362/31 X

*Primary Examiner*—Stephen F. Husar
*Attorney, Agent, or Firm*—David G. Conlin; Robert M. Asher

[57] ABSTRACT

With the aim of mitigating a decrease in flux of light and improving the light utilization efficiency, an optical conductor used in a liquid crystal lighting apparatus is constructed of a plurality of refractive layers $N_1, N_2, \ldots, N_i$ of different refractive indices which are gradually lowered from light incident end surfaces to a center portion of the optical conductor. Light coming from the light incident end surfaces is refracted at interfaces of the refractive layers $N_1, N_2, \ldots, N_i$ so as to reach a light outgoing surface at an incident angle $\theta_i$ which is smaller than a critical angle $\theta_w$, thereby preventing all the beams from undergoing total reflection at the light outgoing surface and shortening the optical length in the optical conductor.

1 Claim, 3 Drawing Sheets

APPARATUS FOR LIGHTING OF LIQUID CRYSTAL

BACKGROUND OF THE INVENTION

1. Field of the Invention

The present invention relates to a lighting apparatus of edge light type used for backlighting of a light receiving type liquid crystal display device.

2. Description of the Prior Art

Conventionally, many examples of lighting apparatus for liquid crystal display devices have been disclosed in such Japanese Laid-open patent publications as Nos. 987/1989 and 171009/1991. In general, as shown in FIG. 1, in a conventional lighting apparatus of edge light type used for a liquid crystal display device, lamps such as cold cathode tubes or hot cathode tubes are used as light sources 1, the light sources 1 are disposed at opposite ends of an optical conductor 2, a diffusion sheet 3 for uniforming the brightness over the entire lighting surface, which is formed of a milk-white, synthetic resin plate using such as acryl, polycarbonate or polyester plate, is provided on the top surface of the optical conductor 2, and a mirror reflector plate or a light scattering acryl plate is used as a reflector sheet 4. The reflector sheet 4 is adapted to improve the utilization efficiency of light by reflecting light, emitted from the light sources and heading to the back side, toward the front side.

Especially, in the field of color LCD panels, it is indispensable to employ stacked polarizer plates which utilize optical anisotropy of liquid crystal and the polarizer plates will cut illumination light by about 50%; and therefore, a backlighting system of higher brightness is needed and it is of importance to improve the utilization efficiency of light.

Denoted in FIG. 1 by 7 is light source reflectors for reflecting, light emitted from the light sources and heading to the outside, toward the optical conductor 2 and by X is a liquid crystal display panel.

In the conventional liquid crystal lighting apparatus of edge light type wherein light is introduced from light incident end surfaces 5 at the opposite ends of the optical conductor 2, the light propagates through the optical conductor 2 while repeating total reflection. In case where an angle between light incident on a light outgoing surface 6 standing for the top surface of the optical conductor 2 and a normal vector of the light outgoing surface 6 is $\theta_o$ and the refractive index of the optical conductor 2 is $n_o$, the light can go out of the light outgoing surface 6 only when $$\theta_o < \sin^{-1}(1/n_o)$$

is valid. Accordingly, with $$\theta_o \geq \sin^{-1}(1/n_o)$$

held, the light repeats total reflection in the optical conductor 2 to travel therethrough while undergoing a decrease in flux of light and a material absorption subject to an absorption coefficient $\alpha$ of an optical conductor material during propagation in the optical conductor 2. More particularly, where an optical path length through which light travels before reaching the light outgoing surface is P and a lamp light flux value at the light incident end surface of the optical conductor is $F_o$, the light undergoes an decrease in flux of light pursuant to $$F = F_o e^{-\alpha P} \text{ (lumen)}$$

and as a result, the utilization efficiency of light is decreased, causing difficulties in realizing a lighting apparatus (backlighting) of high brightness, especially in the field of color LCD units.

SUMMARY OF THE INVENTION

The present invention intends to eliminate the aforementioned problems and it is an object of the invention to provide a lighting apparatus which can reduce the decrease in flux of light and the material absorption in the optical conductor to have high utilization efficiency of light and high brightness.

According to the invention, in a liquid crystal lighting apparatus adapted to backlighting a liquid crystal display panel and comprising an optical conductor disposed in parallel with the liquid crystal display panel and light sources disposed at opposite ends of the optical conductor, the optical conductor has light incident end surfaces opposing the light sources and a light outgoing surface opposing the liquid crystal display panel, the optical conductor being constructed of a plurality of laminated refractive layers $N_1, N_2, \ldots, N_i$ of different refractive indices which are gradually lowered from the light incident end surfaces to a center portion of the optical conductor so that light incoming from the light incident end surfaces may be refracted to make an incident angle $\theta_i$ at the light outgoing surface smaller than a critical angle $\theta_w$.

With the above construction of the invention, light from the light sources goes in the inside of the optical conductor through the light incident end surfaces thereof and then lights the back of the liquid crystal display panel.

In this process, since the optical conductor is constructed of the plurality of laminated refractive layers $N_1, N_2, \ldots, N_i$ having the different refractive indices, the light coming from the light incident end surfaces is refracted at interfaces at the boundaries of the refractive layers $N_1, N_2, \ldots, N_i$ to take an incident angle $\theta_i$ smaller than a critical angle $\theta_w$ when reaching the light outgoing surface, thereby ensuring that the light can be prevented from undergoing total reflection at the light outgoing surface and so the optical path length in the optical conductor can be shortened.

DESCRIPTION OF THE PREFERRED EMBODIMENTS

The invention will now be described by way of example with reference to the accompanying drawings.

Figure 1:
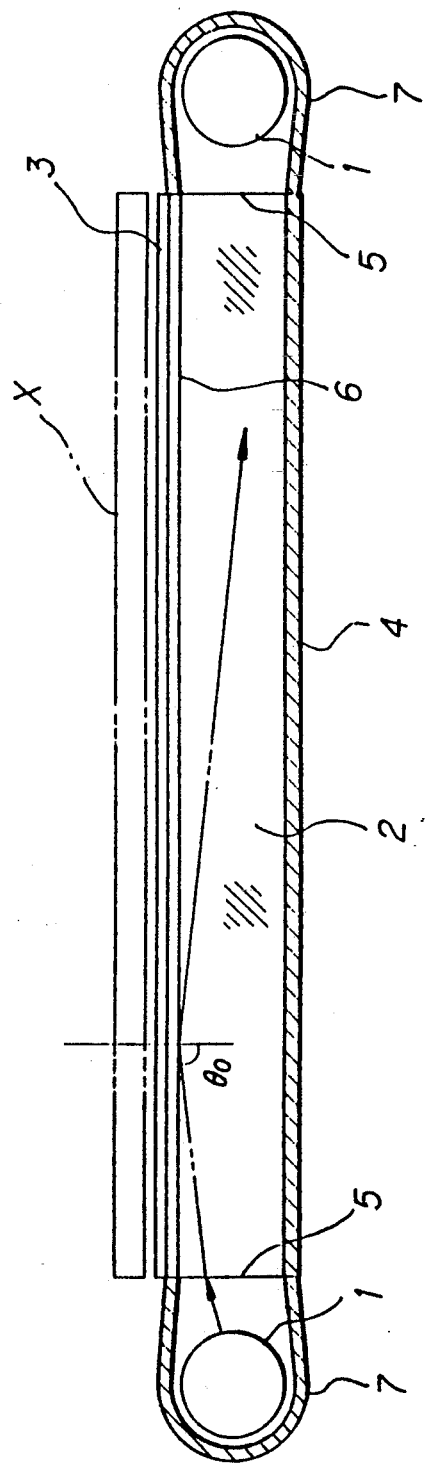
FIG. 1 is a longitudinal sectional view showing a prior art liquid crystal lighting apparatus.
Figure 2:
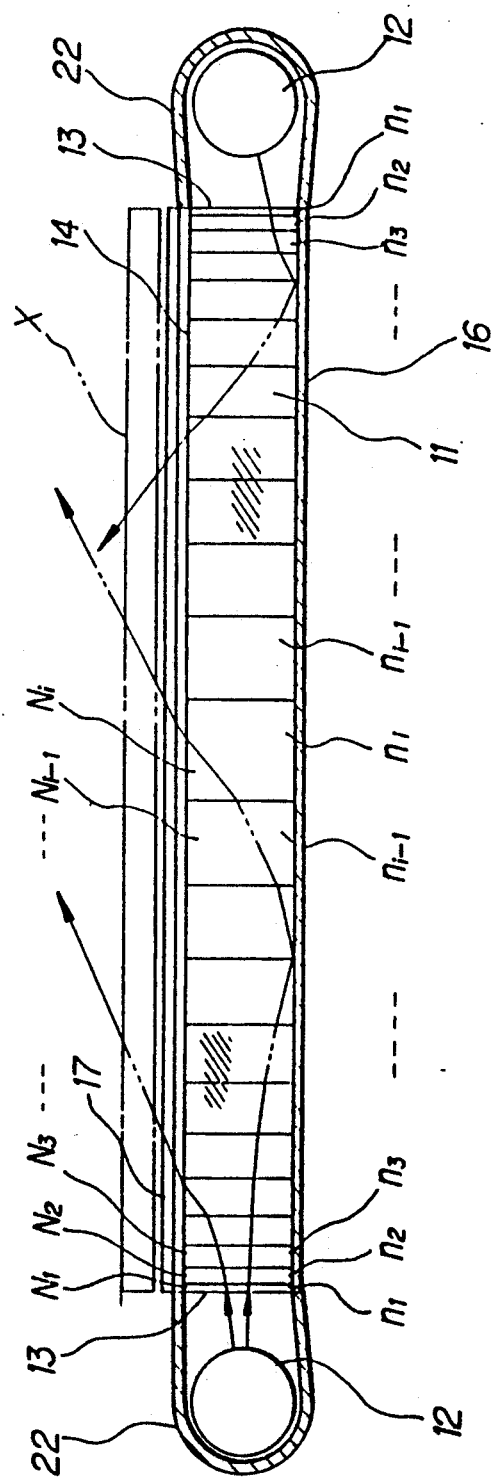
FIG. 2 is a longitudinal sectional view showing a liquid crystal lighting apparatus according to an embodiment of the invention.
Figure 3:
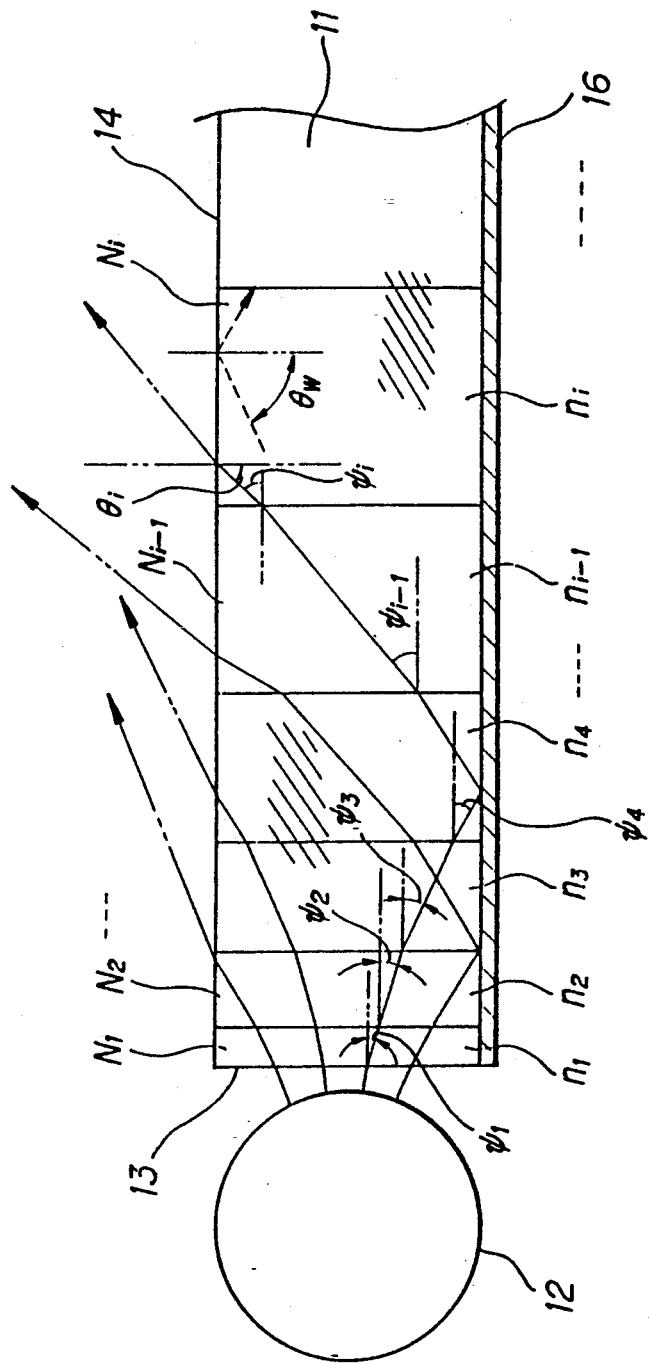
FIG. 3 is a fragmentary, enlarged longitudinal sectional view showing light paths in the FIG. 2 embodiment.

An apparatus for lighting liquid crystal according to an embodiment of the invention is shown, in longitudinal sectional form, in FIG. 2 and light paths in the embodiment are shown, in fragmentary, enlarged longitudinal sectional form, in FIG. 3.

As shown in these figures, the liquid crystal lighting apparatus of the present embodiment is an edge light type lighting apparatus adapted to backlight a liquid crystal panel X and it comprises an optical conductor 11 disposed in parallel with the liquid crystal display panel X, light sources 12 disposed at opposite ends of the optical conductor 11, a reflector sheet 16 for reflecting light, heading backwards in the optical conductor 11, toward the liquid crystal display panel X, and a diffusion sheet 17 for uniforming the brightness over the entire lighting surface.

As shown in FIG. 2 and 3, the optical conductor 11 has light incident end surfaces 13 opposing the light sources 12 and a light outgoing surface 14 opposing the liquid crystal display panel X and it is shaped into a flat plate of a thickness of 2 to 10 mm. The light incident end surfaces 13 are orthogonal to the light outgoing surface 14.

The optical conductor 11 has a dispersive type refractive index. More specifically, the optical conductor 11 is constructed of a plurality of refractive layers $N_1, N_2, \ldots, N_i$ sequentially laminated along the optical path and having different refractive indices effective to refract light coming from the light incident end surfaces 13 so as to make an incident angle $\theta_i$ at the light outgoing surface 14 smaller than a critical angle $\theta_w$.

The individual refractive layers $N_1, N_2, \ldots, N_i$ are formed through molding process using transparent resin materials such as acryl, polycarbonate or polyester materials having refractive indices different from each other. The refractive indices $n_1, n_2, \ldots, n_i$ of the refractive layers $N_1, N_2, \ldots, N_i$ are so set as to be lowered gradually from the light incident end surfaces to a center portion of the optical conductor 11.

Widths of the refractive layers $N_1, N_2, \ldots, N_i$ are so set as to be gradually increased from the light incident end surfaces 13 to the center portion in order that the quantity of light at the light outgoing surface 14 is adjusted to have uniformity.

The interface between adjacent ones of the refractive layers $N_1, N_2, \ldots, N_i$ is made to be vertical to the light outgoing surface 14.

The critical angle $\theta_w$ referred to herein is an incident angle which allows total reflection to occur at the light outgoing surface 14 of the optical conductor 11 and is defined by $$\theta_w = \sin^{-1}(1/n_i)$$

where $n_i$ represents a refractive index of the respective refractive layers $N_1, N_2, \ldots, N_i$. All beams of light are guided such that they take, at the light outgoing surface 14, an incident angle $\theta_i$ which is $$\theta_i < \theta_w = \sin^{-1}(1/n_i).$$

Used as the light source 12 is a hot cathode tube of linear tube type consisting of a luminous element such as a filament and envelope enclosing the element. The light source 12 has a diameter of 3 to 8 mm and an effective lamp length of 100 to 220 mm.

Used as the reflector sheet 16 is an existing mirror surface reflector, light scattering acryl plate or the like.

The diffusion sheet 17 is a milk-white synthetic resin plate having a thickness of 0.07 to 0.3 mm and a transmittivity of 87 to 93% for visual rays of 600 nm wavelength.

As the synthetic resin, known materials such as polycarbonate and polyester may selectively be used as desired.

In FIG. 2, reference numeral 22 designates light source reflectors for reflecting light, emitted from the light sources 12 and heading in directions opposite to the optical conductor 11, toward the optical conductor 11.

With the above construction, internally directed light from the light source 12 directly reaches the light incident surface 13 of the optical conductor 11 and enters into the inside thereof.

On the other hand, externally directed light from the light source 12 is reflected by the light source reflector 22 and then goes into the inside of the optical conductor 11 through the light incident end surface 13 thereof.

Subsequently, the light travelling in the optical conductor is distributed to the diffusion sheet 17 through the light outgoing surface 14.

The light is then distributed substantially uniformly by means of the diffusion sheet 17 to backlight the liquid crystal display panel X.

The optical conductor 11 is constructed of the plurality of laminated refractive layers $N_1, N_2, \ldots, N_i$ of different refractive indices which are so set as to be gradually lowered from the light incident end surfaces 13 to the center portion of the optical conductor 11 and therefore, the light entering the light incident end surface 13 undergoes increasing angles of refraction $\Psi_1, \Psi_2, \Psi_3, \Psi_4, \ldots$ at interface between adjacent ones of the refractive layers $N_1, N_2, \ldots, N_i$ as it proceeds center portion of the optical conductor 11, as shown in FIG. 3.

When as shown in FIG. 3 the angle of refraction at the interface between adjacent refractive layers $N_i$ and $N_{i-1}$ is $\Psi_i$ and the incident angle the outgoing light takes at a portion of light outgoing surface 14 overlying the refractive layer $N_i$ is $\theta_i$, the relation $$\theta_i + \Psi_i = 90°$$

stands, reducing to $$\theta_i = 90° - \Psi_i$$

because the interface between adjacent ones of the refractive layers $N_i, N_2, \ldots, N_i$ is vertical to the light refracting layers $N_i, N_2, \ldots, N_i$ is vertical to the light outgoing surface 14 of the optical conductor 11. Accordingly, by increasing $\Psi_i$ in the manner described previously, $\theta_i$ can be decreased.

Therefore, by setting the refractive indices of the refractive layers $N_1, N_2, \ldots, N_i$ such that the incident angle $\theta_i$ is smaller than the critical angle $\theta_w$ at all the points on the light outgoing surface 14, the angle of refraction $\Psi_i$ can be increased to ensure that the light travelling in the optical conductor 11 can be so guided as not to undergo total reflection. In consequence, all of the light beams can go out of the light outgoing surface 14 as they reach it for the first time and so the optical path in the optical conductor 11 can be shortened. Therefore, a decrease in flux of light at the reflector surface of the optical conductor 11 and a decrease in light flux due to absorption by the material can be mitigated drastically and the surface brightness of the liquid crystal lighting apparatus can be improved.

The present invention is not limited to the foregoing embodiment but obviously the foregoing embodiment may be modified and altered in various ways within the framework of the invention.

While in the foregoing embodiment the light sources are disposed at the opposite ends of the optical conductor 11, a light source may be provided only at one end.

As is clear from the foregoing description, since in the present invention the optical conductor is constructed of the plurality of laminated refractive layers, light coming from the light incident end surfaces can be refracted at the interfaces of the refractive layers to make the incident angle the outgoing light takes at the light outgoing surface smaller than the critical angle.

Consequently, all of the beams can be prevented from undergoing total reflection at the light outgoing surface, thereby attaining beneficial effects that the optical path in the optical conductor can be shortened to mitigate the decrease in light flux and the surface brightness of the liquid crystal lighting apparatus can be improved.

What is claimed is:

1. A liquid crystal lighting apparatus adapted to backlight a liquid crystal display panel and comprising an optical conductor disposed in parallel with said liquid crystal display panel and light sources disposed at opposite ends of said optical conductor, wherein said optical conductor has light incident end surfaces opposing said light sources and a light outgoing surface opposing said liquid crystal display panel and is constructed of a plurality of refractive layers sequentially laminated along the optical path and having different refractive indices which are gradually lowered from said light incident end surfaces to a center portion of said optical conductor so that light incoming from said light incident end surfaces may be refracted to make an incident angle at said light outgoing surface smaller than a critical angle.

* * * * *